Figure 6:
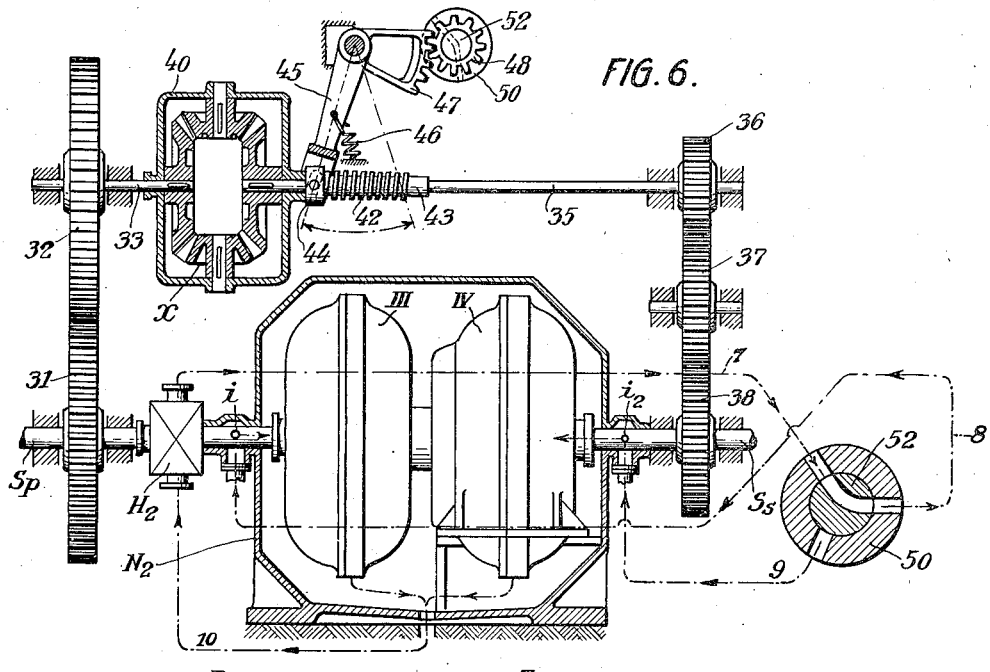

Oct. 22, 1935.  E. MARTYRER ET AL  2,018,616
HYDRODYNAMIC GEAR
Filed Oct. 8, 1934  2 Sheets-Sheet 1
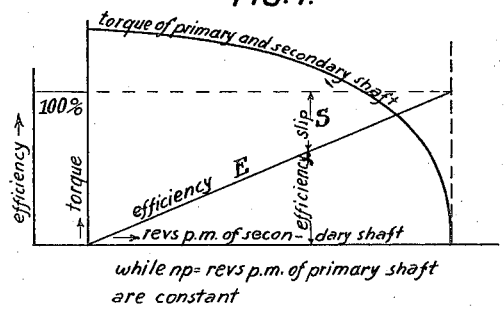
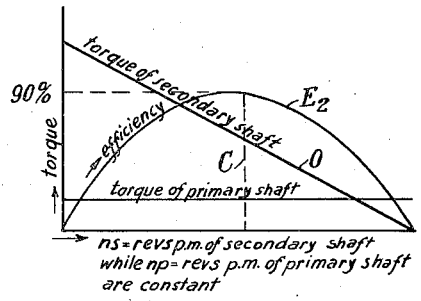
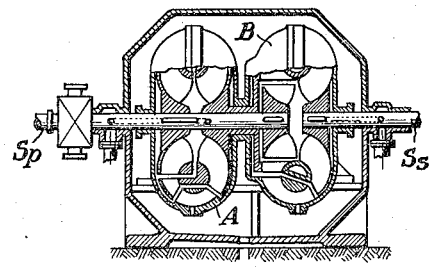
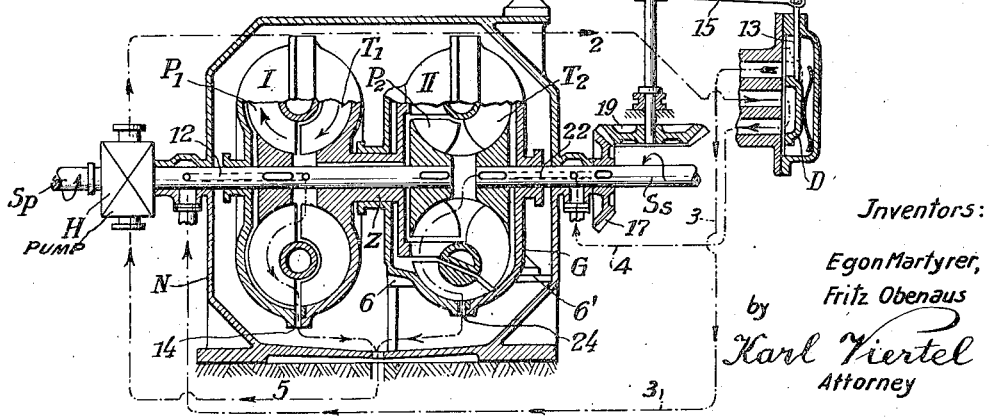
Inventors:
Egon Martyrer,
Fritz Obenaus
by Karl Viertel
Attorney Oct. 22, 1935.  E. MARTYRER ET AL  2,018,616

HYDRODYNAMIC GEAR

Filed Oct. 8, 1934  2 Sheets-Sheet 2

Inventors: Egon Martyrer,
Fritz Obenaus
by Karl Viertel
Attorney

UNITED STATES PATENT OFFICE 2,018,616

HYDRODYNAMIC GEAR

Egon Martyrer, Frankenthal, and Fritz Obenaus, Bad-Durrenberg, Germany, assignors to Klein, Schanzlin & Becker Aktiengesellschaft, Frankenthal (Pfalz), Germany Application October 8, 1934, Serial No. 747,396
In Germany June 19, 1933

8 Claims. (Cl. 60—54)

Our invention relates to improvements in hydrodynamic gears designed for transmitting mechanical power through a liquid medium from one rotary shaft to another rotary shaft, in which Föttinger's flow and reaction principle—disclosed for instance in United States Patent 1,199,359—is involved, according to which by the impeller wheel of a centrifugal pump, keyed to the primary or driving shaft, the liquid medium is thrown against and forced through the bladed wheel or wheels of a turbine, by which the secondary shaft is driven.

The invention has particular utility in connection with vehicles including automobiles, Diesel locomotives etc., which are driven by an internal combustion engine producing a torque of limited value, and in which the torque required at the propeller shaft varies frequently and within relatively wide limits, viz. being far greater during the acceleration periods and on climbing up hills than the maximum torque available at the driving shaft of the engine.

The objects aimed at by this invention will be more fully understood by first reviewing with the aid of the diagrams shown in Figs. 1-3 of the accompanying drawings the structural design, the mechanical efficiency and other working characteristics of the two main classes of Föttinger hydrodynamic gears, namely of (1) couplings, the original and simplest type of his hydrodynamic power transmitters, in which no conversion of torque occurs and which essentially consist of a centrifugal pump wheel keyed to the primary shaft and a turbine wheel keyed to the secondary shaft, and of (2) torque converters, in which the torque of the primary shaft is converted into a torque of greater value at the secondary shaft, and which essentially consist of a centrifugal pump wheel keyed to the primary shaft, a turbine wheel keyed to the secondary shaft, and a non-rotatable or stationary bladed wheel, termed by Föttinger "guide member" through which the liquid medium passes on circulating from the pump wheel to the turbine wheel.

As a matter of fact known to experts in this field brake tests taken under steady working conditions at the primary shaft will show. that the efficiency factor of hydrodynamic couplings, indicated by a straight line E in Fig. 1 steadily increases proportionately to the gain of rotary speed of the driven shaft and reaches its optimum—in practice values close to 100%—mostly 96–98%, while the driven shaft rotates at a speed approximating that of the driving shaft, viz. dis'inguished therefrom by a relatively small slip S, In other words Föttinger hydrodynamic couplings are highly efficient and useful power transmitters from the viewpoint of economy in cases, where the torque required at the secondary shaft is substantially equal to that produced at the primary shaft, as for instance on screw propelled ships; more so because extraordinarily large kinetic energies i. e. torques of high powered engines can be transmitted to the propeller shaft smoothly, free from shocks and vibrations of the engine, which are automatically checked in the coupling; furthermore because the coupling can be easily set into and out of operation by simply filling into or withdrawing from the coupling the liquid medium by a pump; and—last not least— because hydrodynamic couplings due to their structural simplicity are very reliable—i. e. are for extremely long working periods safe against getting out of commission, as compared with friction couplings and like shaft engaging and disengaging gears, which require from time to time overhauling, relining etc.

On account of these valuable properties hydrodynamic couplings have been chosen, in some exceptional cases as power transmission means in motor vehicles, viz. Diesel locomotives, although the latter had to be provided with oversize oil engines, uneconomical as to their fuel consumption, the torque at the main driving shaft of which being powerful enough for starting the train and for climbing, i. e. considerably larger than required for the average load, while the train is running at normal speed and on horizontal sections of the track.

The other class of hydrodynamic power transmission devices to be dealt with in this introductory synopsis comprises torque converters or transformers of the Föttinger type, which essentially consist of a centrifugal pump, the bladed impeller wheel of which is keyed to the primary shaft, of a turbine wheel keyed to the secondary shaft and of a non-rotatable—i. e. stationary bladed shell or guide member, which encloses from all sides the pump and the turbine wheels, the liquid medium flowing from the pump into and through the turbine, which may be of the two-stage type, thereby revolving the latter, and passing meanwhile through the bladed guide member and returning into the centrifugal pump wheel.

The characteristic property and usefulness of this second class of hydrodynamic power transmitters namely of converting the torque of the primary shaft into a greater torque at the secondary shaft is due to the provision and specific function of the stationary element, the bladed guide member, which takes up the difference between both torques and insures the equilibrium of the rotary forces concerned.

The principal working characteristics of Föttinger torque converters are illustrated in Fig. 2 in which the parabolic diagram line E2 indicates the growth and fading of the efficiency factor, as ascertained by actual braking tests, taken under uniform working conditions at the primary shaft of the converter, i. e. while the rotary speed (number of revolutions) of the primary shaft is constant ($np$=constant).

As long as the secondary shaft rotates at a speed corresponding to the normal ratio of gearing for which the individual specimen of torque converter is designed, and which is therefore obviously fixed by construction, for instance 1:3, the maximum efficiency is obtained as indicated by a dotted line C, whereas whenever the rotary speed of the secondary shaft deviates from the "construction"-rate of speed by gaining or losing the efficiency drops and goes eventually down to zero in both cases, viz. when the secondary shaft is arrested, i. e. stopped from rotating for instance by brakes ($ns$=O), and when the secondary shaft attains a speed largely exceeding the normal "construction"-speed.

The parabolic diagram line E2 in Fig. 2 indicating the efficiency factor of hydrodynamic torque converters of the Föttinger type shows, that good results and fairly good results are obtained, only while the secondary shaft rotates at a predetermined "construction"-rate of speed or keeps within limited ranges of speed at the right and left side of the dotted line C.

The sloping diagram line O in Fig. 2, indicating how the torque of the secondary shaft steadily fades away correspondingly to the gain of rotary speed of the latter and eventually goes down to zero, elucidates the fact, that power transmission devices of the Föttinger torque converter type—although producing a conspicuously high torque for starting and accelerating the secondary shaft under load—cannot be used to advantage in motor driven vehicles.

Experts will realize at this juncture the advantages derived from structurally combining a hydrodynamic torque converter with a friction clutch, as proposed for instance in United States Patent 1,298,990 to Mason, by which the motor and the propeller shaft of the vehicle can be direct-connected by the driver, while the vehicle runs under normal conditions at full speed; or from using a composite hydrodynamic gear consisting of a torque converter and a torque non-converting hydrodynamic coupling, as proposed by Nydquist in his Swedish Patent 68,546.

In the latter Nydquist shows, how a hydrodynamic torque converter and a coupling of the Föttinger type can be combined and cooperatively the valuable middle section of diagram line E2 (Fig. 2), characteristic of torque converters, and the valuable upper end of diagram line E (Fig. 1), characteristic of hydrodynamic couplings, shows the efficiency of a hydrodynamic gear designed according to this invention consisting of a torque converter and a coupling; while diagram line E4 (Fig. 4) shows the efficiency characteristic of two torque converters A—B differing from each other in their individual ratio of gearing and being cooperatively associated according to this invention as indicated in Fig. 4a.

In addition thereto the invention deals with a still more advanced and intricate problem namely so designing said composite hydrodynamic gear, that it will automatically change its manner of gearing at the most appropriate time in response to specific changes of the working conditions prevailing at the secondary shaft, i. e. when the rotary speed of the secondary (driven) shaft exceeds a predetermined limit, or drops below said limit.

Another object of the invention is to so design the composite hydrodynamic gear concerned, that its effective ratio of gearing is automatically changed in response to specific changes of the ratio of the rotary speed of the secondary shaft to that of the primary shaft.

Still other objects of the invention will become incidentally apparent hereinafter to practitioners in this field.

Figure 7:
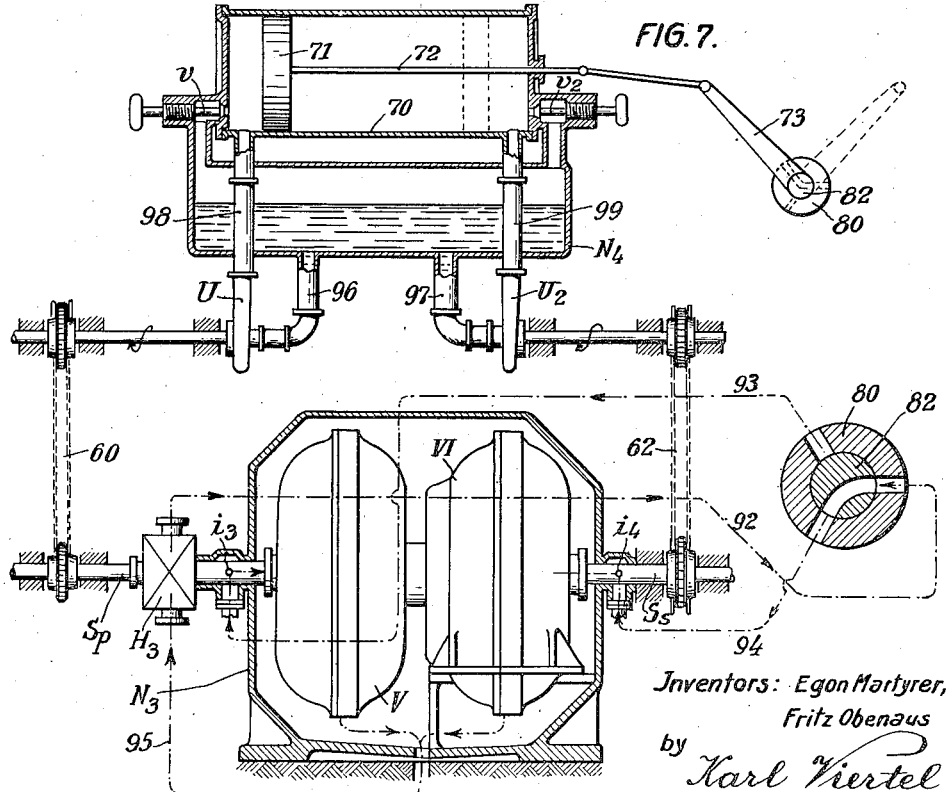

The nature and scope of this invention are briefly outlined in the appended claims and will be more fully understood from the following specification taken together with the accompanying drawings, in which Figs. 1–4 are the diagrams referred to above, Fig. 4a is a vertical longitudinal section through a composite gear comprising two torque converters, Fig. 5 is a vertical section, longitudinally taken through a composite hydrodynamic gear comprising a torque converter and a coupling, and being provided with an automatic gear-changing apparatus designed according to this invention, Fig. 6 is a layout diagrammatically showing by way of another example a gear changing apparatus as applied to a composite hydrodynamic gear designed according to this invention, Fig. 7 is another layout diagrammatically showing a structurally modified gear changing apparatus as applied to hydrodynamic gears designed according to this invention.

Broadly stated our invention consists in applying to a composite hydrodynamic gear comprising two power transmitters of the Föttinger type, which differ from each other in their individual ratio of gearing, a relay or kindred self-acting mechanism so designed and cooperatively associated with the said power transmitters that a selected one of the latter is thrown into and out Fig. 6 the automatic relay has the form of a differential toothed gear designed on the order of a dynamometer and responding to specific changes of the ratio of the rotary speed of the secondary shaft to that of the primary shaft, for instance when that ratio goes beyond or below the "construction"-ratio 3:1. The automatic relay shown in Fig. 7 is of the differential pressure type, comprising a cylinder and piston and a couple of pumps and responding also to specific changes of the ratio of the rotary speed of the secondary shaft to that of the primary shaft.

Referring now to the structural details and the manner of working of the automatic hydrodynamic gear shown by way of an example in Fig. 5, said gear essentially consists of the following elements:

(1) A set of two hydrodynamic power transmitters of the Föttinger type, designated I and II and being coaxially arranged to each other, of which transmitter I is a coupling, while transmitter II is designed as a torque converter; the bladed pump wheels P1 and P2 of said transmitters are keyed to the primary shaft Sp, while the turbine wheel T2 of the torque converter, which is of the two-stage type, is keyed to the secondary shaft Ss; a sleeve Z is attached to and interconnects the turbine wheels T1 and T2 of both power transmitters I and II;—the wheels of the torque converter II are enclosed in a stationary bladed casing G, supported by brackets 6, 6', which represents the guide member of the torque converter, viz. taking up the difference of torques, which are active at the primary and the secondary shaft, and ensuring the equilibrium of rotary forces;—both hydrodynamic power transmitters are provided with intake channels 12, 22, through which the working liquid is filled thereinto by a pump diagrammatically indicated at H, and with outlet ports 14, 24 through which the working liquid passes out of said power transmitters, as indicated by dot and dash lines and arrows in Fig. 5, (2) an automatic gear changing apparatus, which includes an astatic centrifugal governor K of the "Proell" type, the latter being preferably adjustable in a manner known per se in the art as to its critical rotary speed, at which the governor will act, and being driven by a set of bevel gear wheels 17, 19, and a liquid distributing device diagrammatically shown in the form of a slide valve D, which is cooperatively associated by a rod 13 and lever 15 with the governor K and is interconnected by a system of pipes 2, 3, 4, indicated by dot and dash lines, with the said pump H and the intake channels 12, 22 referred to above.

The working liquid discharged through outlet ports 14 or 24 respectively may be conveniently collected by a tank or housing N enclosing the hydrodynamic gear and is drawn into the pump H by another pipe 5.

The operation of the automatic gear changing apparatus is as follows: On starting the motor vehicle, when the rotary speed of the propeller shaft is $ns=0$ the slide valve D is in its lower position, shown in full lines, and will direct the current of working liquid into the converter II, while the coupling I is out of gear. While the vehicle is accelerated and the secondary shaft gains more and more speed, the centrifugal governor K is synchronously rotated and will—because of being adjusted for acting at a certain critical speed eventually raise the valve D into its upper position, shown in dash lines, in which the current of working liquid is directed into and through the coupling I. Reversely on losing speed, for instance on going up hills or on purposely slowing down the motor vehicle in congested traffic, the centrifugal governor will automatically throw into gear the torque converter II. Thus the automatic relay described relieves the driver of the motor vehicle from all gear changing calculations and manipulations, he can concentrate his attention to steering the vehicle, controlling the fuel supply to the motor, and attending to the brakes.

The same is true with the automatic hydrodynamic gear shown by way of another example in Fig. 6; said gear essentially consists of (1) a set of two hydrodynamic power transmitters of the Föttinger type, which may comprise a coupling III and a torque converter IV as shown, or two torque converters A—B (Fig. 4a) differing from each other as to their individual "construction" rate of gearing referred more in detail to in the preamble to this specification and in United States Patent 1,970,236 to Kluge et al.; the arrangement and cooperation of the bladed wheels of said transmitters and their connection with the primary shaft Sp and the secondary shaft Ss is substantially identical to that shown in Fig. 5; and (2) an automatic gear changing apparatus, the latter comprising a couple of spur gear wheels 31, 32 geared to the primary shaft Sp, by which an auxiliary shaft 33 is revolved in clockwise direction and at a rotary speed corresponding to that of the primary shaft, a set of three spur gear wheels 36, 37, 38 geared to the secondary shaft Ss, by which another auxiliary shaft 35 is revolved in anticlockwise direction and at a rotary speed corresponding to that of the secondary shaft,—a differential gear relay X, designed on the order of a dynamometer, and having two pairs of bevel gear wheels 40, which is free to rotate about the axis of shafts 33, 35; to said yoke a hollow shaft surrounding shaft 35 is attached, the middle portion of which is provided with screw threads 42, projecting therefrom, while the end portions, of which only one (43) is visible in Fig. 6 have smooth surfaces, a plug-cock the outer shell 50 of which has 3 passages for cooperation with a rotary plug 52, which is geared to the threaded hollow shaft 42, 43 of the differential gear X by means of a nut 44 provided with projecting pins, a rocking lever 45 having a forked end and engaging said pins, and a toothed sector 47 meshing with a spur wheel 48 which is keyed to said plug 52.

The nut 44 is resiliently kept in engagement with the screw threads 42 by a spring 46 attached to lever 45 and will be moved, whenever the hollow shaft revolves, in accordance to the direction of its rotation from the operative position shown in the drawings in full lines into the other operative position and back, as indicated by dot and dash lines and arrows; concurrently the plug 52 is revolved, whereby the hydrodynamic power transmitters III and IV are reciprocally thrown into and out of gear in substantially the same manner as described above with reference to Fig. 5.

Plug-cock 50, 52 is cooperatively interconnected by a system of pipes 7, 8, 9 with a pump H2 and the intake channels i, i2 of the power transmitters III—IV; the latter are enclosed by a tank N2, in which the working liquid discharged from the transmitters is collected; the working liquid is drawn into the pump H2 through pipe 10.

Obviously instead of a plug-cock 50, 52, shown by way of an example, another liquid distributing device of kindred design known in the art may be employed to advantage.

Various other changes and modifications in the structural details of automatic gear changing apparatus as applied to composite hydrodynamic sets of the type set forth may be made, without substantially departing from the spirit and the salient ideas of this invention.

Instead of the differential toothed gear relay shown in Fig. 6 a differential pressure relay may be conveniently used for automatically changing the effective ratio of gearing of the hydrodynamic set in response to specific changes of the ratio of the rotary speed of the secondary shaft to that of the primary shaft.

In Fig. 7 an automatic gear changing apparatus having a differential pressure relay as applied to a set of hydrodynamic transmitters V—VI of the Föttinger type is shown by way of an example, which comprises: (1) two centrifugal pumps U, U2, the impeller wheels of which are revolved by means of sprocket wheels and chains 60, 62 at rates of speed individually corresponding to those of the primary and secondary shaft Sp and Ss respectively; (2) a cylinder 70 having a piston 71 slidably mounted therein, the rod 72 of which is linked to a lever 73 for operating a three-way plug-cock 80, 82, which is of substantially the same design as described above with reference to Fig. 6 and is connected by pipes 92, 93, 94—diagrammatically indicated by dot and dash lines—with a pump H3 for circulating the working liquid and with the intake channels i3, i4 of the hydrodynamic transmitters V—VI; the working liquid discharged from the latter is collected by a tank N3 enclosing the transmitters and is drawn into pump H3 through a pipe 95, (3) a tank N4 containing another auxiliary liquid substance, for instance oil, which is positively circulated by said pumps U, U2 in two separate circuits, viz. being drawn into said pumps through pipes 96, 97 and driven through pipes 98, 99 into the cylinder 70 at both sides of the piston 71, wherefrom the two currents of liquid return into the tank N4 through adjustable valves v, v2 which are provided for regulating the difference of the hydrostatic pressure of the liquid acting at both sides of the piston 71.

What we claim is:

1. In a composite hydrodynamic gear the combination with a primary power transmitter of the Föttinger type, having an impeller wheel and a turbine wheel, of a second power transmitter of the Föttinger type, having an impeller wheel and a turbine wheel and differing in its ratio of gearing from that of the primary power transmitter, a driving shaft, to which the impeller wheels of both power transmitters are keyed, a sleeve attached to and interconnecting the turbine wheels of both power transmitters, a driven shaft, to which one of the said turbine wheels is keyed, and a self-acting gear-changing apparatus, including a pump, a liquid distributing device and a relay, so designed and cooperatively asociated with said power transmitters, that the supply of liquid to the latter is reciprocally connected and cut off in response to specific changes of the load on the driven shaft.

2. In a composite hydrodynamic gear the combination with a primary power transmitter of the Föttinger type, having an impeller wheel and a turbine wheel, of a secondary power transmitter of the Föttinger type, having an impeller wheel and a turbine wheel and differing in its ratio of gearing from that of the primary power transmitter, a driving shaft, to which the impeller wheels of both power transmitters are keyed, a sleeve attached to and interconnecting the turbine wheels of both power transmitters, a driven shaft, to which one of the said turbine wheels is keyed, and a self-acting gear-changing apparatus, including a pump, a liquid distributing device and a relay, so designed and cooperatively associated with said power transmitters, that the supply of liquid to the latter is reciprocally connected and cut off in response to specific changes of the ratio of the rotary speed of the driven shaft to that of the driving shaft.

3. In a composite hydrodynamic gear the combination with a primary power transmitter of the Föttinger type, having an impeller wheel and a turbine wheel, of a secondary power transmitter of the Föttinger type, having an impeller wheel and a turbine wheel and differing in its ratio of gearing from that of the primary power transmitter, a driving shaft, to which the impeller wheels of both power transmitters are keyed, a sleeve attached to and interconnecting the turbine wheels of both power transmitters, a driven shaft, to which one of the said turbine wheels is keyed, and a self-acting gear-changing apparatus, cooperatively associated with the said driven shaft and being adapted to throw into and out of gear a selected one of said power transmitters by directing a current of the working liquid therethrough in response to specific changes of the rotary speed of the driven shaft,—said automatic gear-changing apparatus comprising liquid distributing means adapted to control the passage of said current of working liquid to and from said power transmitters, and a centrifugal governor cooperatively associating said distributing means and the driven shaft of the hydrodynamic gear.

4. In a composite hydrodynamic gear the combination with a primary power transmitter of the Föttinger type, having an impeller wheel and a turbine wheel, of a secondary power transmitter of the Föttinger type, having an impeller wheel and a turbine wheel and differing in its ratio of gearing from that of the primary power transmitter, a driving shaft, to which the impeller wheels of both power transmitters are keyed, a sleeve attached to and interconnecting the turbine wheels of both power transmitters, a driven shaft, to which one of the said turbine wheels is keyed, and a self-acting gear-changing apparatus, cooperatively associated with the said driven shaft and being adapted to throw into and out of gear a selected one of said power transmitters by directing a current of the working liquid therethrough in response to specific changes of the rotary speed of the driven shaft,—said automatic gear-changing apparatus comprising liquid distributing means adapted to control the passage of said current of working liquid to and from said power transmitters, and a centrifugal governor cooperatively associating said distributing means and the driven shaft of the hydrodynamic gear,—said liquid distributing means comprising intake channels and discharge ports provided at the hydrodynamic transmitters for taking in and discharging therefrom the working liquid, a tank for collecting the discharged liquid, a pump, a distribution valve, actuated by said centrifugal governor, and a system of pipes interconnecting said distribution valve, pump, tank, intake channels and discharge ports.

5. In a composite hydrodynamic gear the combination with a primary power transmitter of the Föttinger type, having an impeller wheel and a turbine wheel, of a secondary power transmitter of the Föttinger type, having an impeller wheel and a turbine wheel and differing in its ratio of gearing from that of the primary power transmitter, a driving shaft, to which the impeller wheels of both power transmitters are keyed, a sleeve attached to and interconnecting the turbine wheels of both power transmitters, a driven shaft, to which one of the said turbine wheels is keyed, and a selfacting gear-changing apparatus, cooperatively associated with the said driving and driven shafts, and being adapted to throw into and out of gear a selected one of said power transmitters by directing a current of working liquid therethrough in response to specific changes of the ratio of the rotary speed of the driven shaft to that of the driving shaft,—said automatic gear changing apparatus comprising a liquid distributing device for controlling the passage of said current of working liquid to and from said power transmitters and a differential toothed gear relay cooperatively associated with the driving shaft, the driven shaft and said liquid distributing device.

6. In a composite hydrodynamic gear the combination with a primary power transmitter of the Föttinger type, having an impeller wheel and a turbine wheel, of a secondary power transmitter of the Föttinger type, having an impeller wheel and a turbine wheel and differing in its ratio of gearing from that of the primary power transmitter, a driving shaft, to which the impeller wheels of both power transmitters are keyed, a sleeve attached to and interconnecting the turbine wheels of both power transmitters, a driven shaft, to which one of the said turbine wheels is keyed, and a selfacting gear-changing apparatus, cooperatively associated with the said driving and driven shafts and being adapted to throw into and out of gear a selected one of said power transmitters by directing a current of working liquid therethrough in response to specific changes of the ratio of the rotary speed of the driven shaft, to that of the driving shaft,—said automatic gear changing apparatus comprising a liquid distributing device for controlling the passage of said current of working liquid to and from said power transmitters and a differential toothed gear relay cooperatively associated with the driving shaft, the driven shaft and said liquid distributing device,—said differential toothed gear relay comprising two pairs of bevel gear wheels which are journaled in a yoke having a hollow shaft attached, two auxiliary shafts for driving said bevel gear wheels which revolve in opposite direction to each other and are geared to the driving shaft and the driven shaft respectively.

7. In a composite hydrodynamic gear the combination with a primary power transmitter of the Föttinger type, having an impeller wheel and a turbine wheel, of a secondary power transmitter of the Föttinger type, having an impeller wheel and a turbine wheel and differing in its ratio of gearing from that of the primary power transmitter, a driving shaft, to which the impeller wheels of both power transmitters are keyed, a sleeve attached to and interconnecting the turbine wheels of both power transmitters, a driven shaft, to which one of the said turbine wheels is keyed, and a selfacting gear-changing apparatus, cooperatively associated with the said driving and driven shafts and being adapted to throw into and out of gear a selected one of said power transmitters by directing a current of working liquid therethrough in response to specific changes of the ratio of the rotary speed of the driven shaft to that of the driving shaft, said automatic gear changing apparatus comprising a liquid distributing device for controlling the passage of said current of working liquid to and from said power transmitters,—and a hydraulic differential pressure relay cooperatively associated with the driving shaft, the driven shaft and said liquid distributing device.

8. In a composite hydrodynamic gear the combination with a primary power transmitter of the Föttinger type, having an impeller wheel and a turbine wheel, of a secondary power transmitter of the Föttinger type, having an impeller wheel and a turbine wheel and differing in its ratio of gearing from that of the primary power transmitter, a driving shaft, to which the impeller wheels of both power transmitters are keyed, a sleeve attached to and interconnecting the turbine wheels of both power transmitters, a driven shaft, to which one of the said turbine wheels is keyed, and a selfacting gear-changing apparatus, cooperatively associated with the said driving and driven shafts and being adapted to throw into and out of gear a selected one of said power transmitters by directing a current of working liquid therethrough in response to specific changes of the ratio of the rotary speed of the driven shaft to that of the driving shaft, said automatic gear changing apparatus comprising a liquid distributing device for controlling the passage of said current of working liquid to and from said power transmitters, and a hydraulic differential pressure relay cooperatively associated with the driving shaft, the driven shaft and said liquid distributing device,—said hydraulic differential pressure relay comprising a tank containing an auxiliary liquid substance, a cylinder having a piston slidably mounted therein, two centrifugal pumps for circulating said liquid in two separate circuits through the said cylinder at both sides of the piston, driving means for individually revolving the impeller wheels of said centrifugal pumps at a rotary speed corresponding to that of the driving shaft and driven shaft respectively, and means for controlling by hand the effective hydraulic pressure upon both sides of the said piston.

EGON MARTYRER.
FRITZ OBENAUS.